United States Patent [19]

Hart

[11] Patent Number: 5,404,832
[45] Date of Patent: Apr. 11, 1995

[54] WELLHEAD CONNECTOR

[75] Inventor: Brian Hart, Wakefield, England

[73] Assignee: Cooper Industries, Inc., Houston, Tex.

[21] Appl. No.: 89,000

[22] Filed: Jul. 9, 1993

[30] Foreign Application Priority Data

Jul. 20, 1992 [EP] European Pat. Off. ............ 92306631

[51] Int. Cl.⁶ ..................... E21B 33/038; F16L 37/08
[52] U.S. Cl. .......................................... 166/96; 285/18
[58] Field of Search ...................... 166/368, 96; 285/18, 285/368, 920

[56] References Cited

U.S. PATENT DOCUMENTS

| 4,491,345 | 1/1985 | Regan . | |
|---|---|---|---|
| 4,730,853 | 3/1988 | Gjessing | 285/18 |
| 5,141,257 | 8/1992 | Taylor . | |
| 5,255,743 | 10/1993 | Adam et al. | 285/18 X |

FOREIGN PATENT DOCUMENTS

| 0367419 | 5/1990 | European Pat. Off. . |
|---|---|---|
| 2014684 | 8/1979 | United Kingdom . |
| 2186043 | 8/1987 | United Kingdom . |

Primary Examiner—William P. Neuder
Attorney, Agent, or Firm—Conley, Rose & Tayon

[57] ABSTRACT

A connector for connecting two tubular members (1,2) having annular flanges (3,4) at their ends. The connector comprising an actuating ring (13) movable in the axial direction of the tubular members (1,2), a plurality of upper dogs (15) for engaging the flange (3) of the upper tubular member (1) and a corresponding plurality of lower dogs (17) for engaging the flange (4) of the lower tubular member (2). Each pair of upper (15) and lower (17) dogs are connected by a stud (24) and are axially separable providing a sealed cavity (22) between the dogs which is supplied, in use, with hydraulic fluid. In use, the supply of hydraulic fluid to the cavity (22) forces the upper (15) and lower (17) dogs apart to tension the stud, so that, when the dogs are moved adjacent to the upper and lower flanges (3,4) and the pressure in the cavities (22) is released, the tension in the stud will be released allowing the upper (15) and lower (17) dogs to slide back together and clamp the upper (3) and lower (4) flanges together.

8 Claims, 4 Drawing Sheets

WELLHEAD CONNECTOR

The present invention relates to a connector for use on a wellhead.

For many years, there have been numerous requirements for connectors that possess high pre-load capabilities. Conventionally this has been achieved in subsea applications using a connector having an actuator ring in the form of an annular piston which is moved downwardly to force by cam action fingers of a collet ring radially inwardly into embracing engagement with flanges on the two members to be connected. The pressures and bending moments at such a wellhead are often very high and therefore in order to prevent separation of the flanges it is desirable that some pre-load is provided to hold the flanges together. The prior art devices achieve this pre-load by means only of inclined faces on the flanges engaging complementary faces on the collet fingers, and the cam action of the annular piston. This requires the piston and collet to be massive, resulting in a very expensive connector.

The prior art thus includes a connector for connecting the lower end of an upper tubular member having an annular flange to the upper end of a lower tubular member having an annular flange, the connector comprising an actuator ring, axial movement of which is arranged to move a ring of connector elements radially inwardly into a position embracing the two flanges; and in accordance with the invention, such a connector is characterised in that each connector element comprises a pair of axially separable dogs which are interconnected by a tension member and which define between them a sealed cavity connected to a source of fluid pressure, whereby the dogs of each element can be urged apart to tension the tension members prior to the elements being moved radially inwardly by the actuator ring to embrace the flanges.

Advantageously, the tension members are studs.

In order to ensure that a uniform pressure is applied to all of the cavities, it is desirable to link the cavities by a manifold.

The actuator ring may itself be a piston. However, preferably the actuator ring is axially movable by a ring of pistons and cylinders. These cylinders can be made small in size as they are required only to move the actuator ring causing the dogs to embrace the flanges and do not produce any pre-load.

Preferably, the lower dogs are keyed to the connector so as to be radially slidable and held against axial movement. This provides a smooth engagement/disengagement between the dogs and the flanges.

Each pair of dogs may be keyed to the actuator ring so as to be slidable along a downwardly flared radially inner face of the actuator ring and held against movement away from the face of the actuator ring. Thus raising of the actuator ring causes the dogs to move away from the flanges.

The connector may further have at least one indicator rod which is fixed to the actuator ring and projects from the connector. This provides a visual indication of the position of the actuator ring.

The connector is intended to be used with an upper tubular member having an annular flange adjacent to its lower end, and a lower tubular member having an annular flange adjacent to its upper end, the axial dimension of the flanges being such that, when the tubular members are in engagement and the dogs have been moved to embrace the flanges, release of the fluid pressure in the sealed cavity will cause the dogs to be pulled together by at least partial release of the tension in the tension members and clamp the two flanges towards one another.

The pre-tension is therefore provided by the upper and lower dog arrangement connected by a tension member and is not dependent on the force extended by the actuator ring. The dogs can therefore be made smaller than the collet fingers of the prior art. This leads to the further advantage that the same connector can be used in a low preload application where a high preload is not essential.

An example of a connector constructed in accordance with the present invention will now be described with reference to the accompanying drawings in which.

Figure 1:
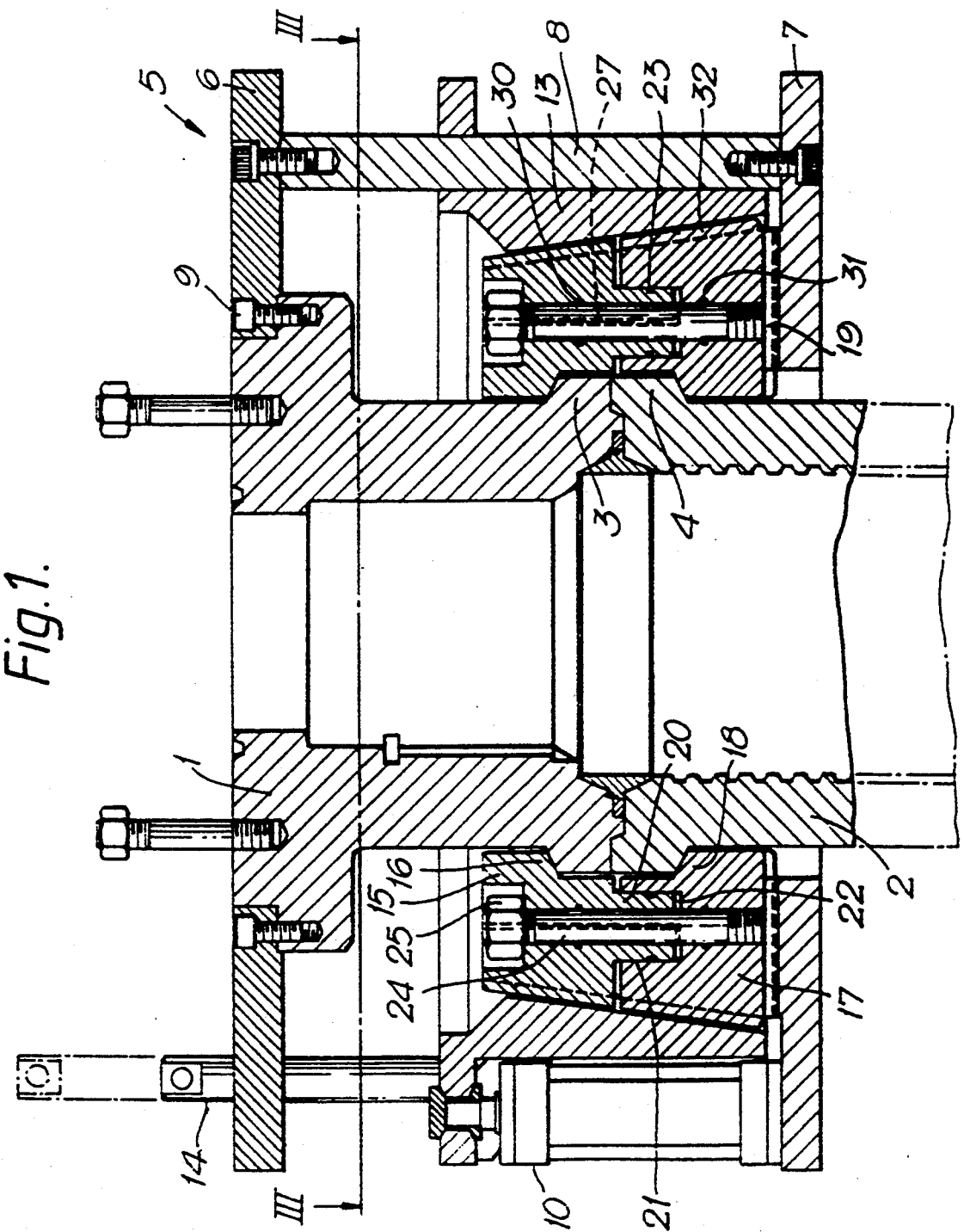
FIG. 1 is a section through a first example of a connector on a wellhead in an engaged position.
Figure 2:
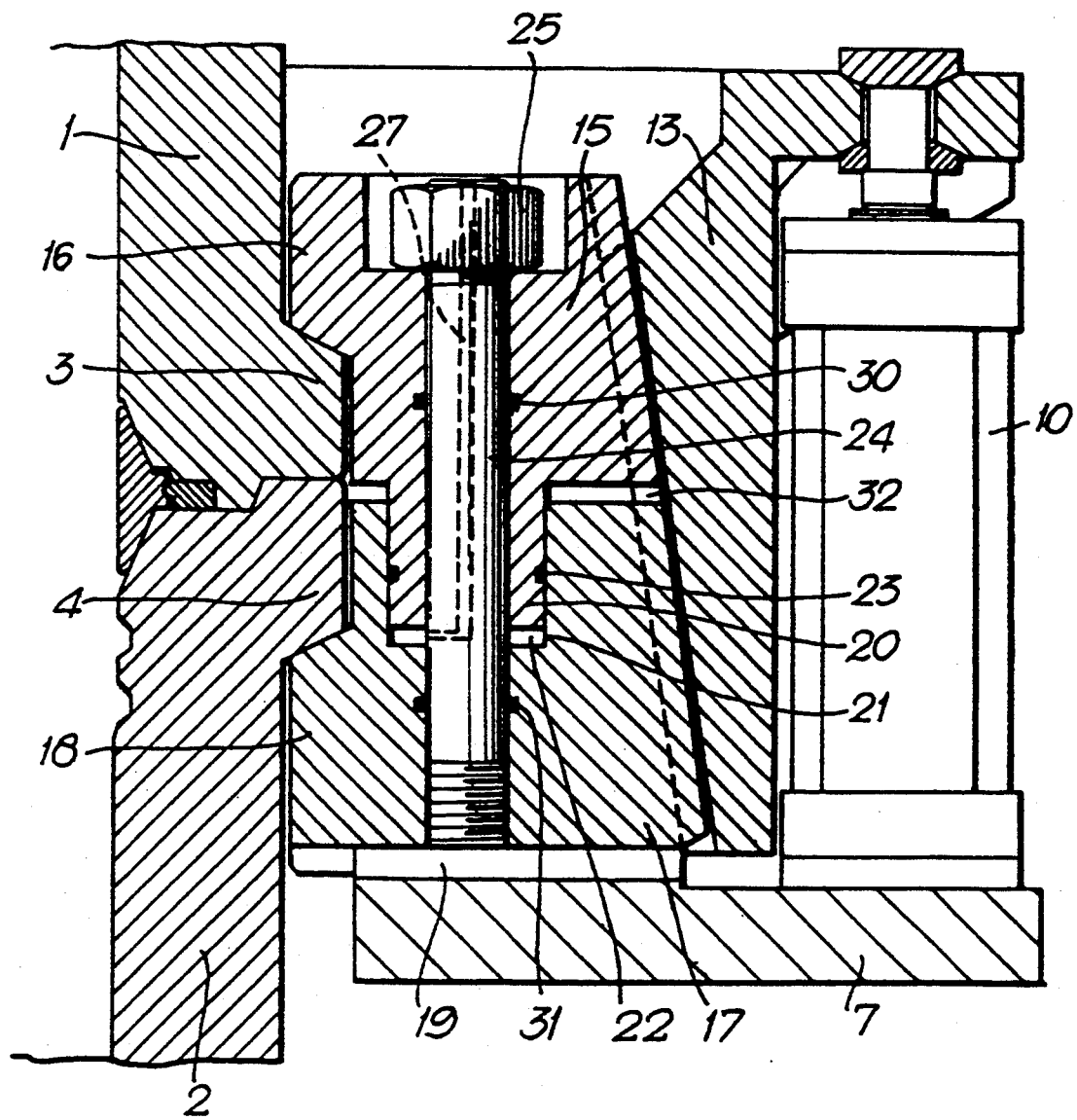
FIG. 2 shows a part of the arrangement of FIG. 1 in detail.
Figure 3:
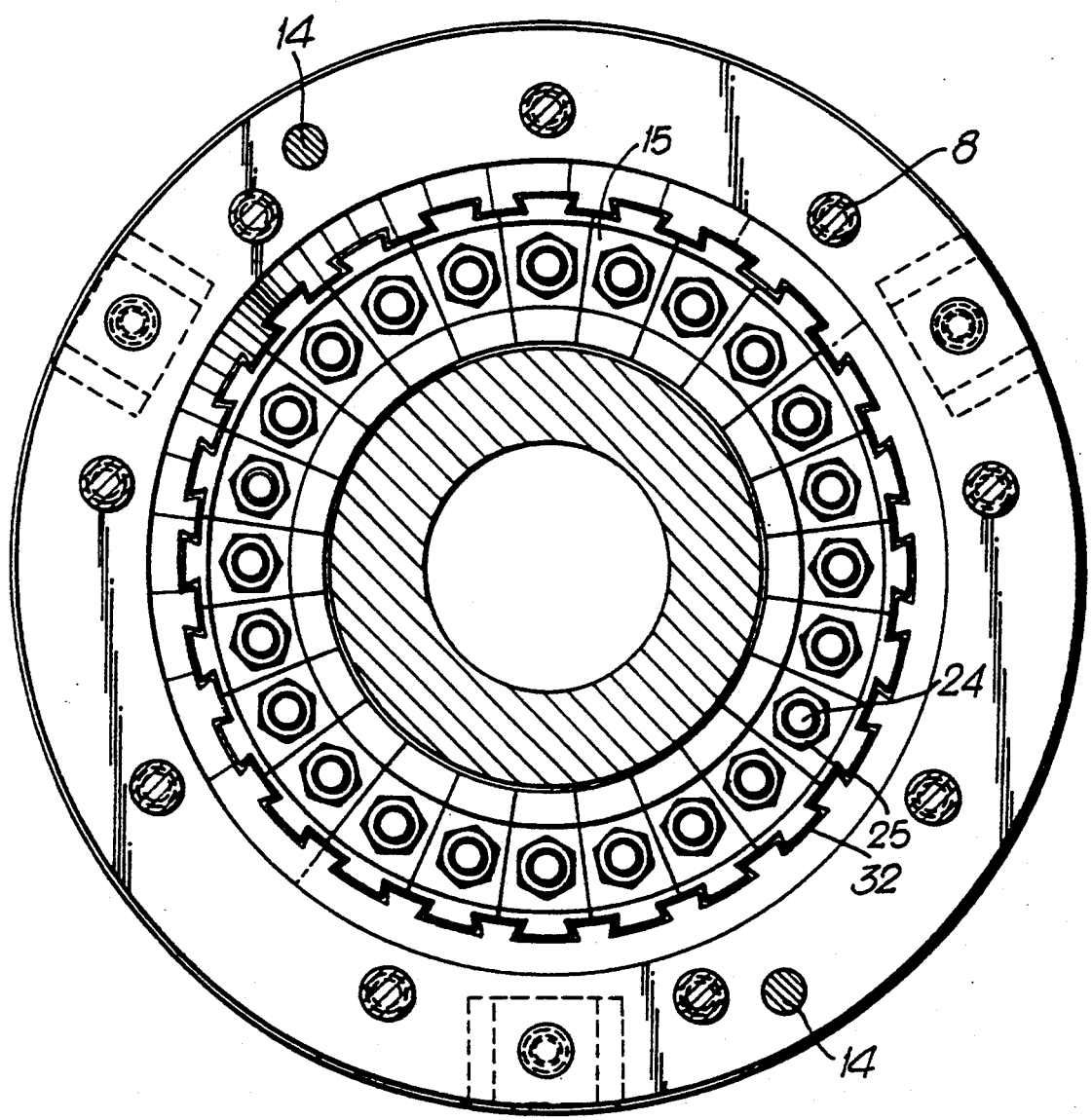
FIG. 3 shows a section along line III—III in FIG. 1.

The connector in FIGS. 1, 2, 3 and 5 is shown clamping together upper 1 and lower 2 tubular members of a wellhead. In practice the upper tubular member 1 may be a blow out preventer stack and the lower tubular member 2 may be the wellhead casing or alternatively the upper tubular member 1 could be the lower riser assembly and the lower tubular member 2 could be the blow out preventer stack. As an additional alternative, the upper tubular member 1 could be a Christmas tree assembly with the lower tubular member 2 being the wellhead casing.

The upper tubular member 1 faces downwardly and is provided at its lower edge with an external annular flange 3 the upper face of which is downwardly and radially outwardly inclined. The upper tubular member 3 mates with the lower tubular member 4 which faces upwardly and is provided at its upper edge with a flange 4 the lower face of which is upwardly and radially outwardly inclined and which is arranged to abut and seal against the flange 3 of the upper tubular member 1.

The connector comprises a collar 5 having upper 6 and lower 7 annular plates. The plates 6, 7 are connected by nine steel rods 8. The upper plate 6 is permanently secured to the upper tubular member by bolts 9. Three cylinders 10 and associated pistons disposed around the axis of the tubular members are fixed to the lower plate 7. The cylinders 10 are supplied with hydraulic fluid along supply lines 11 and exhaust the fluid along drain lines 12.

An actuator ring 13 is fixed to the pistons so as to be axially slidable therewith. The actuator ring 13 has a downwardly flared radially inner surface. Two indicator rods 14 are connected to the actuator ring 13. The rods 14 extend upwardly from the cylinder and through a hole in the upper plate 6. The rods 14 provide a visual indication of the position of the actuator ring 13.

Twenty four upper dogs 15 are disposed around the axis of the tubular members 1, 2 and each one is provided with a radially inner flange 16, the lower face of which is upwardly and radially inwardly inclined for engagement with the flange 3 on the upper tubular member 1. A corresponding plurality of lower dogs 17 are provided around the axis of the tubular members 1, 2. Each lower dog 17 is provided at its radially inner face with a flange 18 the upper face of which is downwardly and radially inwardly inclined for engagement with the flange 4 of the lower tubular member 2. The lower dogs 17 are keyed to the lower plate 7 by keys 19 in the form of complementary ribs and grooves of a dovetail section which allow relative radial movement but not relative axial movement between the lower dogs 17 and the lower plate 7.

The lower face of each upper dog 15 is provided with a spigot 20 which mates with a corresponding counter-bore 21 in the upper face of each respective lower dog 17 in a piston and cylinder like arrangement forming a cavity 22. A sealing ring 23 is fitted to the outer peripheral surface of the spigot 20 to seal against the counter-bore 21.

Figure 4:
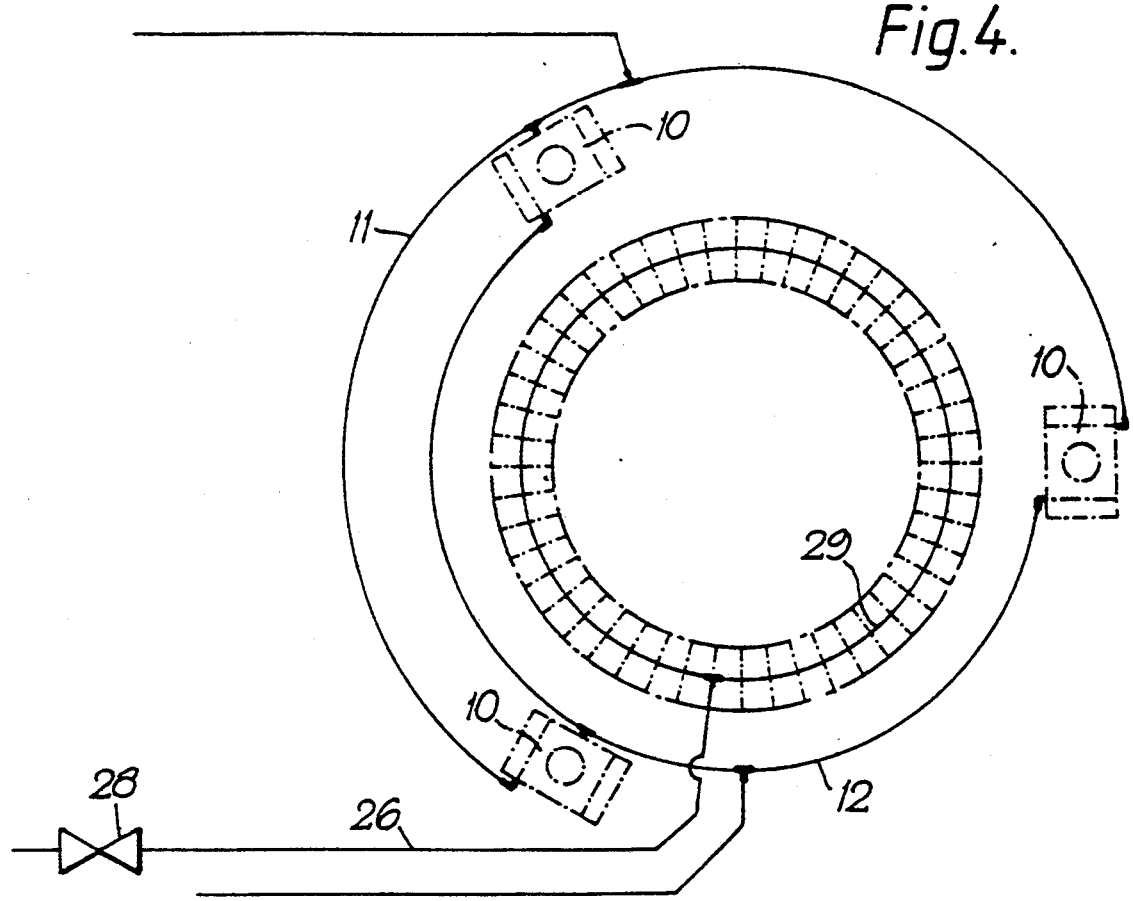
FIG. 4 shows the hydraulic circuit of the connector.

Each pair of upper 15 and lower 17 dogs is connected by a stud 24 which is screwed through an axial bore in both dogs 15, 17 passing through the centre of the spigot 20 and counter-bore 21. The stud 24 is secured by a nut 25 at the upper surface of the upper dog 15. A supply of hydraulic fluid is provided via a supply line 26 and conduit 27 in the stud 24 to the cavity and is controlled by a needle valve 28 (see FIG. 4). The cavities 22 are connected to a common manifold 29 to ensure that a uniform pressure is supplied to each one. Sealing rings 30 and 31 are provided to seal the bolt 24 to the upper 15 and lower 17 dogs respectively. The radially outer surfaces of each pair of upper 15 and lower 17 dogs are downwardly flared corresponding to the downward flare of the actuator ring 13. The upper 15 and lower 17 dogs are keyed to the actuator ring 13 by means of keys 32 in the form of complementary ribs and grooves of dovetail section which hold the dogs 15, 17 captive on the actuator ring 13 but allow them to slide relatively up and down relatively to the actuator ring 13.

Prior to fitting the connector to the flanges, hydraulic fluid is supplied to each cavity 22 formed between a respective spigot 20 and counter-bore 21 under the control of the needle valve 28. This tends to force apart each pair of upper 15 and lower 17 dogs and pretensions the studs 24 with a desired load.

With the upper 1 and lower 2 tubular members in engagement in the position shown in the figures, the pretensioned connector is aligned with the flanges. At this time the connector is in its initial position with the indicator rods 14 in their uppermost position (shown in phantom lines in FIG. 1) indicating that the actuator ring is in its raised position and the dogs 15, 17 held away from the tubular members 1, 2. The pistons are then actuated causing the actuator ring to slide axially downwards. This causes the dogs 15, 17 to slide radially inwards along the keys 19 and by virtue of the flared surfaces of the actuator ring 13 and dogs 15, 17. Once the dogs are in place, the hydraulic pressure can be released by opening the needle valve 28. The tension in the stud 24 then provides a force which tends to pull the upper 15 and lower 17 dogs together providing a clamping force on the flanges 3, 4 of upper 1 and lower 2 tubular members to hold them together.

To unlock the connector, pressure is again applied to the cavity 22 to tension the stud so that the clamping force is released. Upward movement of the actuator ring 13 by the pistons causes the dogs 15, 17 to move radially outwardly and out of engagement with the flanges 3, 4, upon separation of the members 1 and 2.

Figure 5:
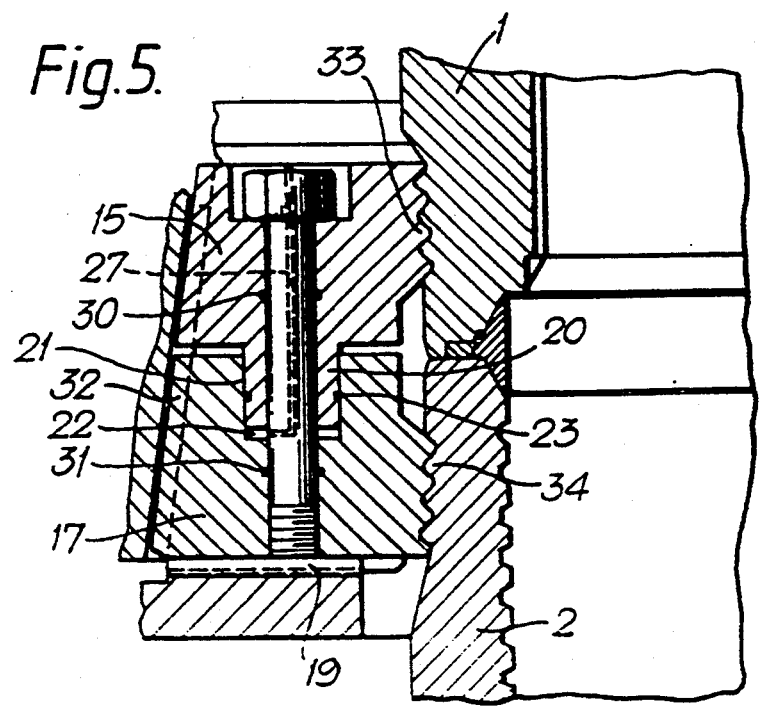
FIG. 5 shows a part of a second example of a connector on a wellhead in detail.

FIG. 5 shows a modification of the interengaging flange arrangement on a different style of wellhead. A series of axially spaced annular flanges 33 on the radially inner faces of the dogs 15,17 engage with and embrace complementary flanges 34 on the radially outer faces of the tubular members 1,2. The other aspects of this example are the same as those of the first example.

It is claimed:

1. A wellhead connector for connecting the lower end of an upper tubular member (1) having an annular flange (3) to the upper end of a lower tubular member (2) having an annular flange (4); the connector comprising an actuator ring (13), axial movement of which is arranged to move a ring of connector elements (15,17) radially inwardly into a position embracing the two flanges (3,4); characterized in that each connector element comprises a pair of axially separable dogs (15,17) which are interconnected by a tension member (24) and which defined between them a sealed cavity (22) connected to a source of fluid pressure, where the dogs (15,17) of each element can be urged apart to tension the tension member (24) prior to the elements being moved radially inwardly by the actuator ring (134) to embrace the flanges (3,4).

2. A wellhead connector according to claim 1, wherein the tension members (24) are studs.

3. A wellhead connection according to claim 2, wherein the cavities (22) are linked by a manifold.

4. A wellhead connector according to claim 3, wherein the actuator ring (13) is axially movable by a ring of pistons and cylinders.

5. A wellhead connector according to claim 4, wherein the lower dogs (17) are keyed to the connector so as to be radially slidable and held against axial movement.

6. A wellhead connector according to claim 5, wherein each pair of dogs (15,17) is keyed to the actuator ring (13) so as to be slidable along a downwardly flared radially inner face of the actuator ring (13).

7. A wellhead according to claim 6, further comprising at least one indicator rod (14) fixed to the actuator ring (13) and projecting from the connector.

8. A wellhead assembly comprising an upper tubular member (1) having an annular flange (3) adjacent to its lower end, a lower tubular member (2) having an annular flange (4) adjacent to its upper end, and a connector according to any one of the preceding claims, the axial dimension of the flanges (3,4) being such that, when the tubular members are in engagement and the dogs (15,17) have been moved to embrace the flanges, release of the fluid pressure in the sealed cavity (22) will cause the dogs (15,17) to be pulled together by at least partial release of the tension in the tension members (24) and clamp the two flanges (3,4) towards one another.

* * * * *